Oct. 30, 1934.　　　A. K. WHITMER　　　1,979,129
MILK BOTTLE WASHER
Filed April 29, 1931　　　12 Sheets-Sheet 1

Fig1

INVENTOR.
Arthur K Whitmer
BY
Fay Oberlin & Fay
ATTORNEY.S,

Oct. 30, 1934.  A. K. WHITMER  1,979,129
MILK BOTTLE WASHER
Filed April 29, 1931    12 Sheets-Sheet 3

INVENTOR.
Arthur K Whitmer
BY
Fay Oberlin & Fay
ATTORNEYS

Oct. 30, 1934.  A. K. WHITMER  1,979,129
MILK BOTTLE WASHER
Filed April 29, 1931   12 Sheets-Sheet 4

INVENTOR.
Arthur K. Whitmer
BY
Fay Oberlin & Fay
ATTORNEYS

Fig.14

Patented Oct. 30, 1934

1,979,129

UNITED STATES PATENT OFFICE 1,979,129

MILK BOTTLE WASHER

Arthur K. Whitmer, Canton, Ohio

Application April 29, 1931, Serial No. 533,603

24 Claims. (Cl. 15—61)

This invention relates to an apparatus and method for washing bottles having a relatively wide neck and, more particularly, the invention relates to an apparatus and method for continuously washing milk bottles in an improved sanitary manner.

The present apparatus is a bottle washer of the single end type having loading and discharging means at the same end and permitting one operator to feed in bottles while, at the same time, inspecting the discharged bottles. In washers of this type which are continuous and automatic in operation, no provision has been made heretofore for preventing the transmission of disease germs from one bottle to another and it would be possible for typhoid or diphtheria germs from an infected household to be transferred to a large number of other bottles in the washer, thus endangering the health of a community. In the present construction and method, elements which might transmit germs from one bottle to succeeding bottles are sterilized after contact with each bottle and before being brought into contact with the succeeding bottle. Various means have been constructed, in addition to sterilizing means, to permit the sterilizing operation to be incorporated in a machine which shall be continuous and automatic in operation and perform its function with the same facility as is found in installations which do not incorporate my sterilizing step.

It is, accordingly, an object of the invention to provide a continuous automatic bottle washer which shall be sanitary in operation. Another object of the invention is to provide a bottle washer in which each bottle is maintained in sterilized relation to other bottles being treated. A further object of the invention is to provide automatic intermittently operating sterilizing means in a bottle washer. Still another object of the invention is to provide a method of washing bottles which is automatic, continuous and sanitary.

To the accomplishment of the foregoing and related ends, said invention, then, consists of the means hereinafter described and particularly pointed out in the claims. The annexed drawings and the following description set forth in detail certain means and one mode of carrying out the invention, such disclosed means and mode illustrating, however, but one of various ways in which the principle of the invention may be used.

In said annexed drawings:

Fig. 6 is a similar view showing bottles advanced to a pre-rinse sliding carrier.

In the present system for washing bottles, a continuous succession of these are placed by an operator on a rack and automatic machinery advances the bottles through the successive stages of washing until the clean bottles are ejected and carried away. The bottle leaves the rack and is subjected to a pre-rinse operation accompanied by a sterilizing step, is then transported to a position adjacent the main body of the washer and is pushed into an endless traveling chain where it occupies a wire basket adapted to receive it. Held in this basket, the bottle travels through a bath of alkali or other cleaning fluid and is eventually raised out of such bath and subjected to various spraying and rinsing operations, these also being carried on in connection with accompanying sterilizing means. Eventually the bottle is allowed to drain and is pushed out of its wire basket to be carried away for filling. Electric motors or other driving means are used to operate the apparatus, but the present invention is not concerned therewith, the driving and power-transmitting means necessary being of well known type.

Figure 1:
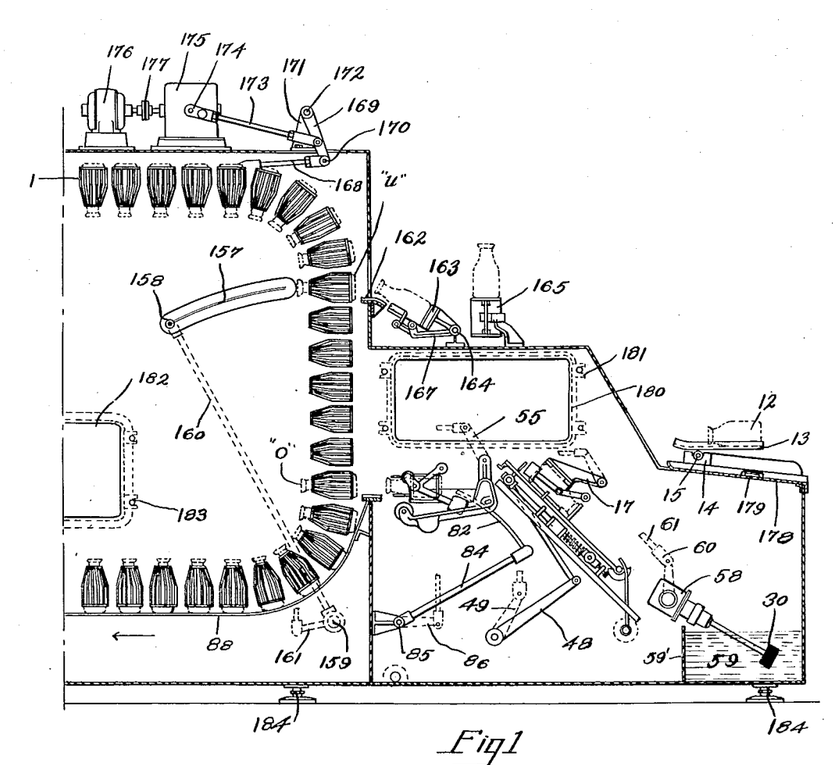
Fig. 1 is a side elevation of the front end of the washer.
Figure 2:
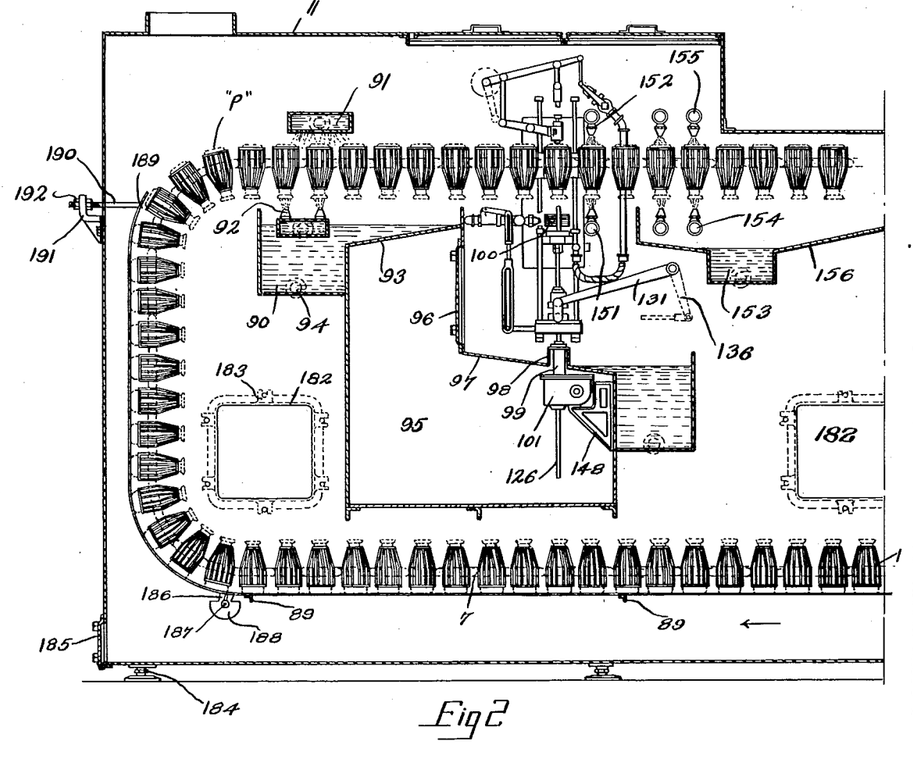
Fig. 2 is a view of the rear portion of the elevation shown in Fig. 1.

Referring to Figs. 1 and 2 of the drawings, a plurality of wire baskets 1 are connected in an endless chain and carry the bottles through the body of the washer. A commercial washer will consist of a number of these conveyors or chains in parallel, the commercial installation being ordinarily from four to twelve deep although larger sizes may be used, and a popular size being eight deep.

Figure 14:
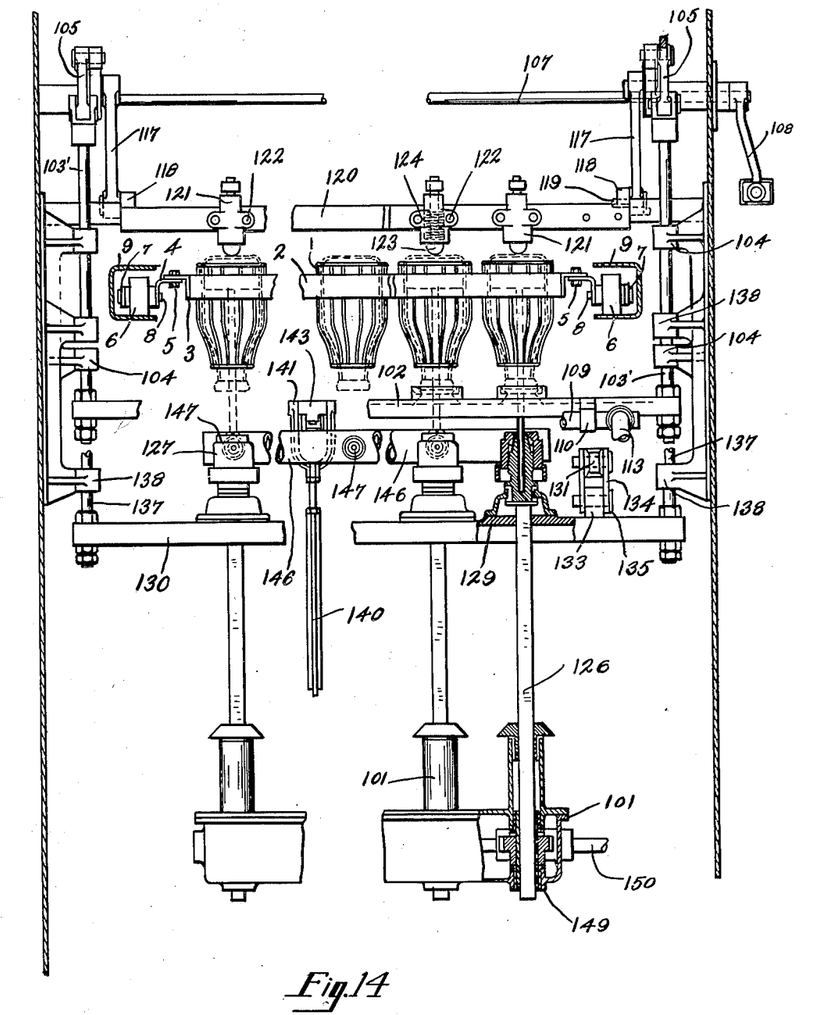

Referring more particularly to Fig. 14, the wire baskets 1 are welded to cross members 2 which are connected by angle members 3 to flanged links 4, the members 3 having flanges turned outward so that they may be bolted to the links 4 by means of bolts 5. By these means, a rank of bottles is supported on rollers 6, one on each end of the rank. The rollers supporting each rank are connected to the rollers supporting adjacent ranks by outside links 7 and on the inside by the flanged links 4 to which the rollers are connected by chain pins 8, the rollers and connecting links thus forming an endless chain which travels in channel-track 9 on a rectangular course through the washer 11. The outside connecting links 7 forming the endless chain may be seen in Figs. 1 and 2 of the drawings.

Figure 3:
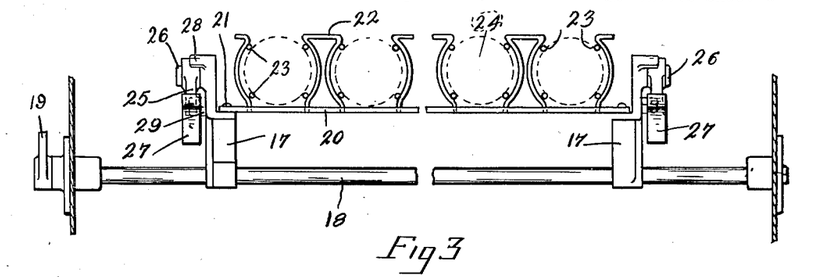
Fig. 3 is an end view of a bottle rack.
Figure 4:
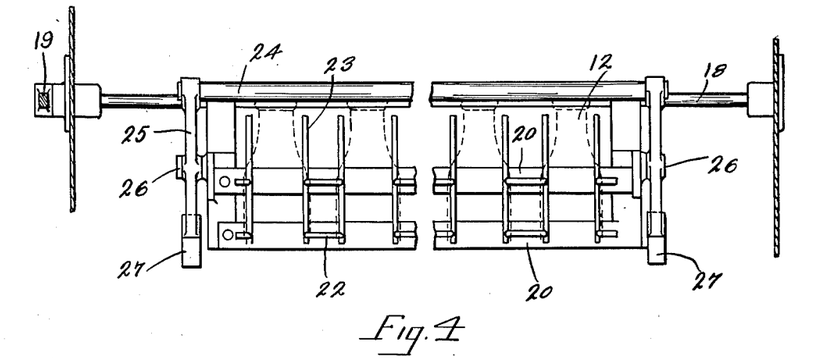
Fig. 4 is a top plan view of the bottle rack shown in Fig. 3.
Figure 5:
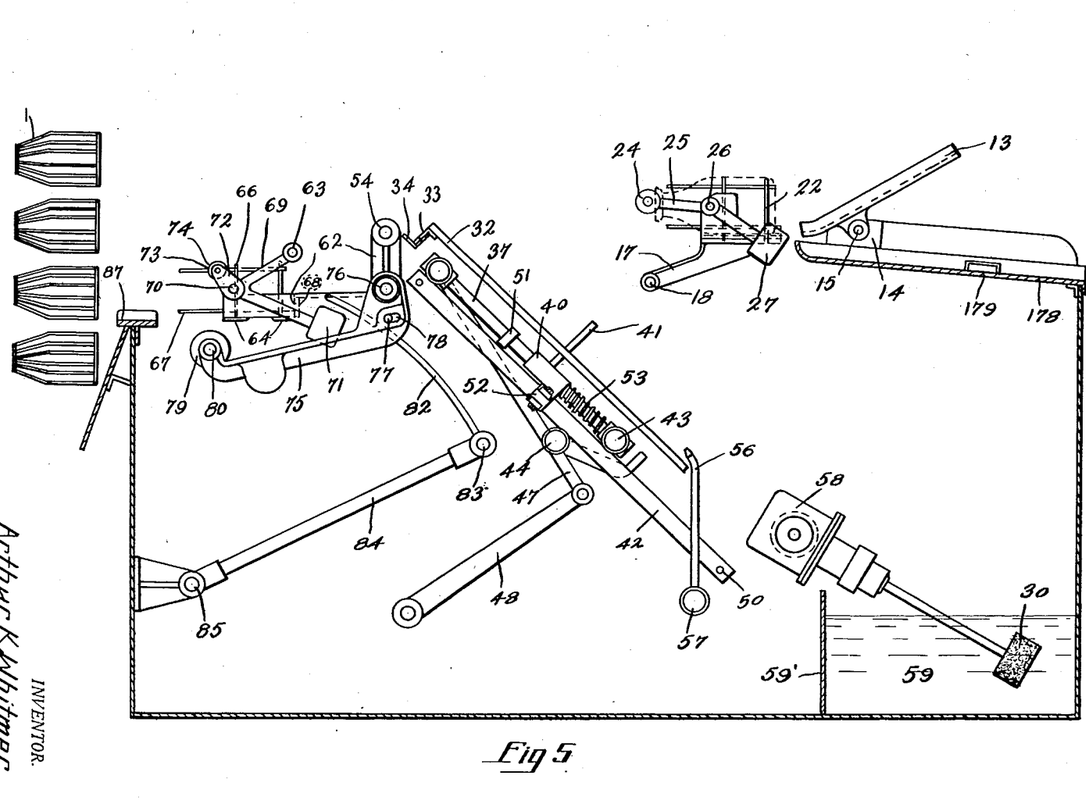
Fig. 5 is a side elevation of a pre-rinse mechanism with bottles on a pre-rinse loading carrier.

A bottle commences its course through the washer by being placed manually on a bottle rack 13, to be seen in Fig. 1, which is supported at the sides by a U-shaped bearing 14 and in which it may be swung to an inclined position on shaft 15. Referring now to Fig. 5, the bottle slides from the rack 13 into an element termed a pre-rinse loading carrier consisting of two end brackets 17 mounted on a shaft 18 and operated through the lever 19. The brackets 17 are connected together by two cross members 20, shown in Fig. 3, being riveted thereto by rivets 21. These cross members 20 are provided with curved wires 22 which cooperate with a plurality of horizontal rods 23 to form a pocket for holding bottles. A bottle leaving the rack 13 slides into this pocket and is restrained from sliding entirely through the pocket by means of the cross bar 24 which is pivotally connected to the bracket 17 by means of a lever 25 and a pin 26. A counterweight 27 is provided for the lever 25. The function of the pre-rinse loading carrier is to transfer a bottle from the rack 13 to a position on the upper part of an element known as a pre-rinse sliding carrier which is done by swinging the loading carrier about the point 18, the cross bar 24 preventing the bottle from sliding out during travel and the counterweight 27 dropping down under the influence of gravity to swing the cross bar 24 clear of the mouth of the pocket when the loading carrier is in position on the sliding carrier to be relieved of the bottle. This position of the loading carrier is shown in Fig. 6 of the drawings. Lugs 28 and 29 limit the travel of the counterweight 27.

Figure 9:
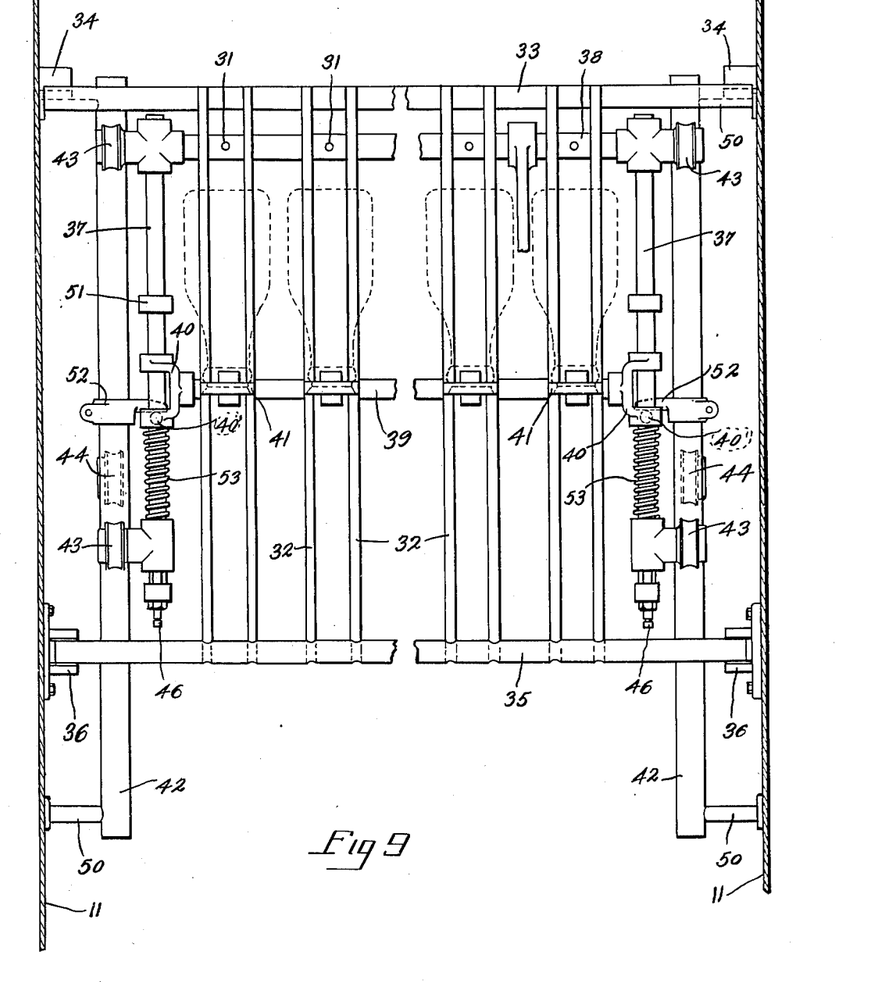
Fig. 9 is a top plan view of the pre-rinse sliding carrier.

When the pre-rinse loading carrier has taken the position shown in Fig. 6, a pin 31 on the pre-rinse sliding carrier moves downwardly to push the bottle out of the loading carrier and over a brush 30, leaving the loading carrier free to swing back into position for receiving another bottle from the rack 13. The bottle is now on the pre-rinse sliding carrier (see Fig. 9) which is a mechanism consisting of stationary members 32 joined together at their upper ends by angle members 33, these being supported by clips 34 which are welded to the washer body 11. The lower ends of the stationary members 32 are supported by cross member 35 mounted in a U-shaped bearing 36 on the washer body. These stationary members 32 straddle the bottle sliding pins 31, above mentioned. The sliding mechanism of the carrier is composed of laterally inclined members 37 connected at the end by cross member 38 on which are carried the pins 31. An intermediate cross member 39 is slidably connected to the laterally inclined members 37 by a fitting 40 and carries bottle stops 41 which are located centrally with respect to members 32 and the center of the bottle. The sliding mechanism is carried upon a tubular track 42 on which it bears through rollers 43 and to which it is held in traveling contact by means of rollers 44. The friction between the rollers and the tubular track is regulated by means of the lever 45 and adjusting screw 46. The tubular track 42 is mounted on the washer body 11 through cross members 50.

The pre-rinse sliding mechanism is operated through the link 47 and the lever 48 through which power is transmitted. On the downward stroke the bottle has been pushed to the position shown in Fig. 7, where the bottle rests down over the revolving brush 30. On this downward stroke, the fitting 40 is held against a finger 52 (see Fig. 9) by a spring 53 until the collar 51 contacts with the fitting and carries it downward. When the bottle has been thoroughly rinsed, the return stroke of the sliding mechanism brings the bottle back to the at-rest position, during which movement the fitting pin 40' engages the finger 52 and prevents further upward movement of members 39, 40 and 41, which are held against the bottle by the spring 53, while the remainder of the sliding mechanism travels a greater distance sufficient to permit bottles to be removed from the sliding carrier by a discharge carrier without being obstructed or impeded by the pin 31.

At the end of the downward travel of the bottle on the pre-rinse sliding carrier, water is played into the bottle through a tube 56 leading from a header pipe 57 while the brush is revolved inside of the bottle by driving gears in gear box 58. Bearing hubs 58' on the gear box are utilized as trunnions for swinging the brush away from the sliding carrier after the bottle has returned to its former position and to immerse the brush, while revolving, in a sterilizing solution 59, maintained in a compartment partitioned off by the wall 59'. After being thoroughly sterilized, the brush and gear box are returned to their original position and are ready to receive the next bottle moving downward on the slide.

Figure 7:
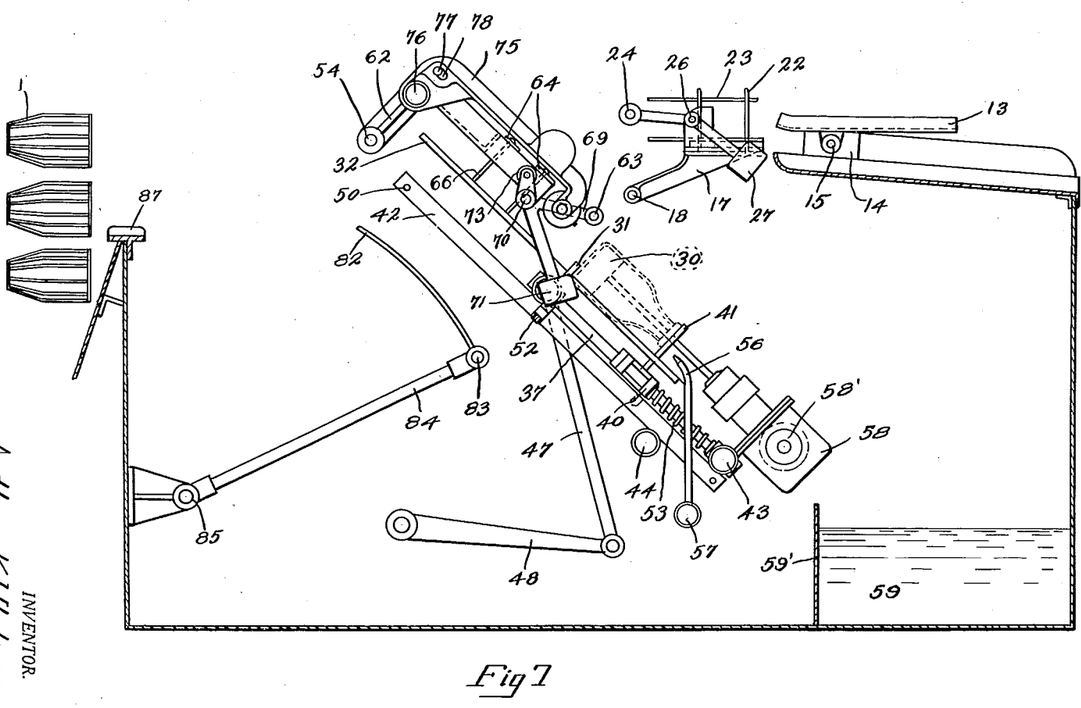
Fig. 7 is another side elevation of the pre-rinse mechanism showing bottles moved down over a brush.
Figure 8:
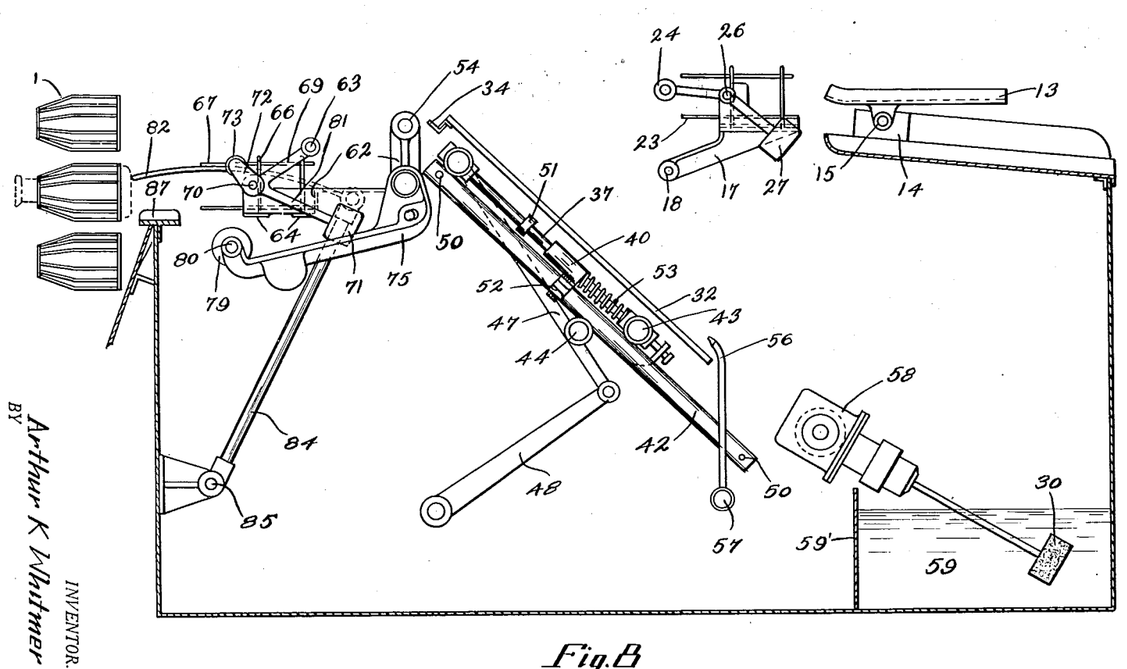
Fig. 8 is a side elevation showing bottles transferred to endless conveyors in washer.
Figure 10:
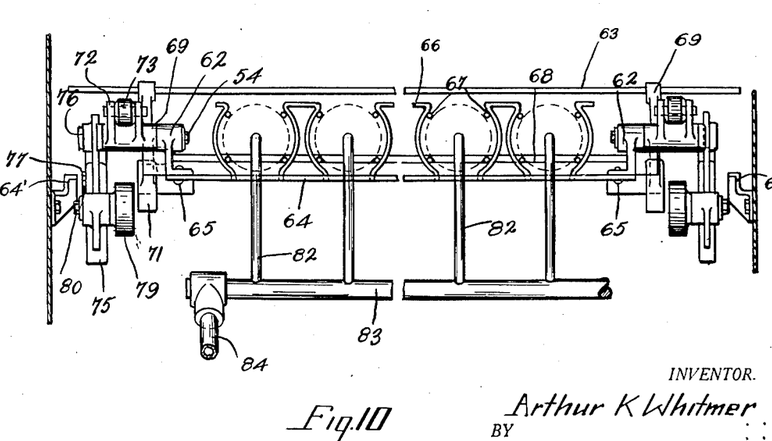
Fig. 10 is an end elevation of a pre-rinse discharge carrier.

While the bottle is held over the brush on the sliding carrier, and after the pre-rinse loading carrier has returned to its position adjacent the body rack 13, a pre-rinse discharge carrier swings over to occupy a position at the upper end of the sliding carrier shown in Fig. 7. When the bottle which has been rinsed is returned to the upper part of the slide, it is received by this discharge carrier which swings on a shaft 54. The pre-rinse discharge carrier is made up of two side brackets 62 which are mounted on the shaft 54 and connected together by two members 64 which are attached to the side brackets by rivets 65. As may be seen in Fig. 10, the members 64 support curved spacers 66 to which members 67 are attached, thus forming a bottle pocket. A cross member 68 permanently closes one end of the pocket to prevent the bottles from sliding downward while the carrier is in a vertical position, this member 68 being attached to side brackets 62. The receiving and discharging end of the pocket is closed by a cross bar 63 which prevents the bottles from sliding out when the carrier is in an inverted position. This bar is held slightly elevated by the bracket 64' when the carrier is in position for receiving bottles from the sliding carrier, thus permitting bottles to be slid under the cross bar and into the carrier. The cross bar 63 is attached to a lever 69 which is pivotally connected to side brackets 62 by the pin 70, the lever 69 being in turn provided with a counterweight 71 and an outwardly projecting fork-shaped lug 72. This fork-shaped lug carries a roller 73 which revolves on a pin 74. A latch member 75 is hingedly connected to side brackets 62 by means of pins 76, the limits of travel of member 75 being governed by pin 77 moving in slot 78. The free end of member 75 is provided with a roller 79 revolving on pin 80.

The pre-rinse discharge carrier rests at the upper end of the sliding carrier and receives a bottle while in that position, the cross member 63 resting on the member 64' so as to keep the end of the bottle pocket open to permit the bottle to be slid thereinto. The discharge carrier then commences to swing about the shaft 54, the bottle carrier moving upward slightly before the bottle reaches a position directly opposite the cross member 63 which is being held on the member 64'. During this initial travel, the counterweight 71 drops a slight distance until the rollers 79 and 73 come in contact with each other, thus locking the cross member 63 in front of the bottle while the bottle is inverted. When the carrier has passed the topmost point in its travel, there is no further possibility of the bottle dropping out and it is, furthermore, necessary that the receiving end of the pocket be freed so that the bottle may be discharged from the carrier. Removal of the cross bar 63 from in front of the bottle is accomplished at this point by the action due to the excess weight of the latch member 75 with its center of gravity on one side of the pivot pin 76 which causes this latch member to drop away, the rollers 79 and 73 rolling apart. The cross member 63 is now free, under the influence of the counterweight 71, to drop back toward the inner end of the carrier. When the carrier finally reaches its discharging position opposite the wire basket 1, the cross bar 63 is out of the way and the counterweight 71 rests on the lug 81 provided for the purpose. The bottle may be now ejected from the pre-rinse discharge carrier by means of fingers 82 which are attached to a cross member 83 and an arm 84 which is pivoted at point 85. The bottles are ejected from the carrier by means of the finger 82, over a corrugated bridge member 87, and into one of the wire baskets of the endless chain.

Referring again to Figs. 1 and 2 of the drawings, the bottles enter the endless chain at point O and are carried on a downward course and across the bottom of the washer body riding on strips 88 which are suspended above the bottom of the tank by angles 89. The bottles pass through a strong alkali bath or other cleaning bath with which the bottom of the washer is filled. When the bottles reach the opposite end of the tank from the point of entrance O, they are elevated and solution in the bottles drains out until the point P is reached and the bottles are turned with the necks downward. As the bottles start across the top of the washer, they pass over a tank of alkali 90 and this is forced over and inside of the bottles under pressure by the perforated manifold 91 and the jets 92. This alkali solution is recirculated over and over again. The bottles then pass over drainboard 93, the drained solution returning to the tank for recirculation by way of opening 94 with which a pump is connected. An opening 95 extends through the body of the washer from side to side and a door 96 opens therein, through which the inside mechanism can be inspected and inside brushes replaced and adjusted. Another drainboard 97 is sloped for rinse water to drain off over the opening 95, this drainboard being provided with a chimney 98 through which the hub of the gear box 99 extends to drive brushes 100. The gear box 101 is placed in the opening 95 for convenience, so that any grease that might drop from the gears will fall to the bottom of the opening 95 and not become mixed with rinse water or alkali solution in the interior of the washer. This arrangement is very convenient and permits easy access to the gear box.

Figure 11:
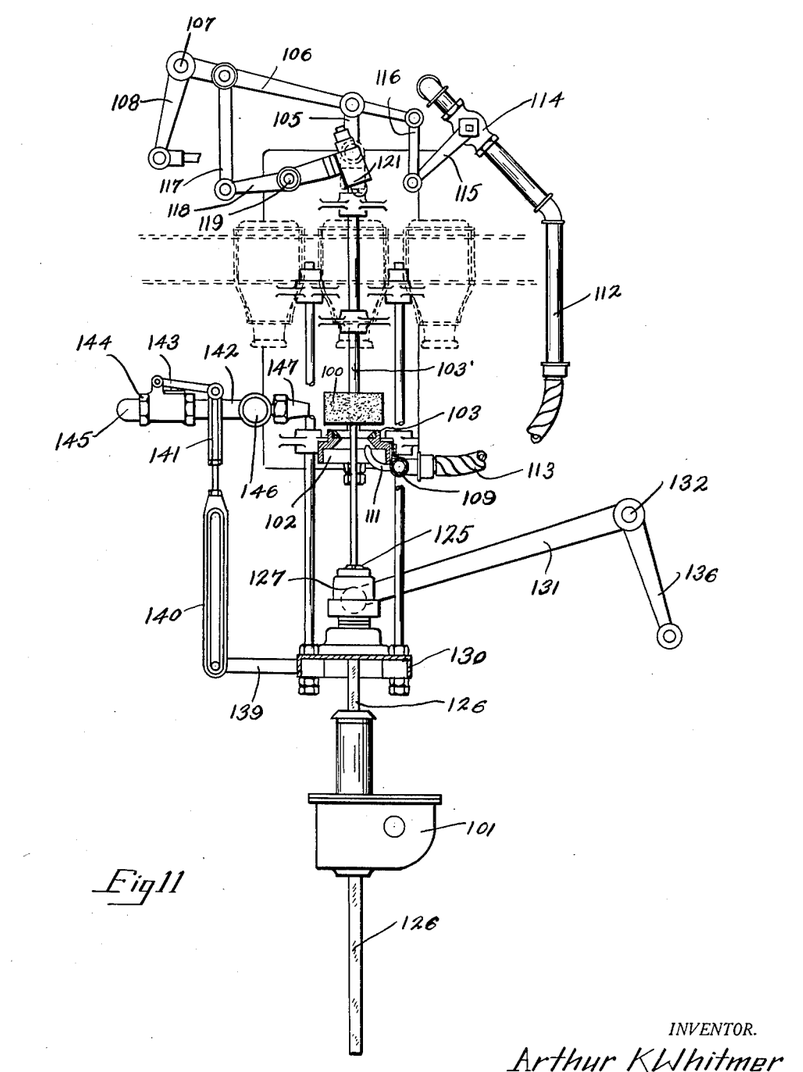
Fig. 11 is a side elevation of a final brushing mechanism showing the brushes withdrawn from bottles.
Figure 12:
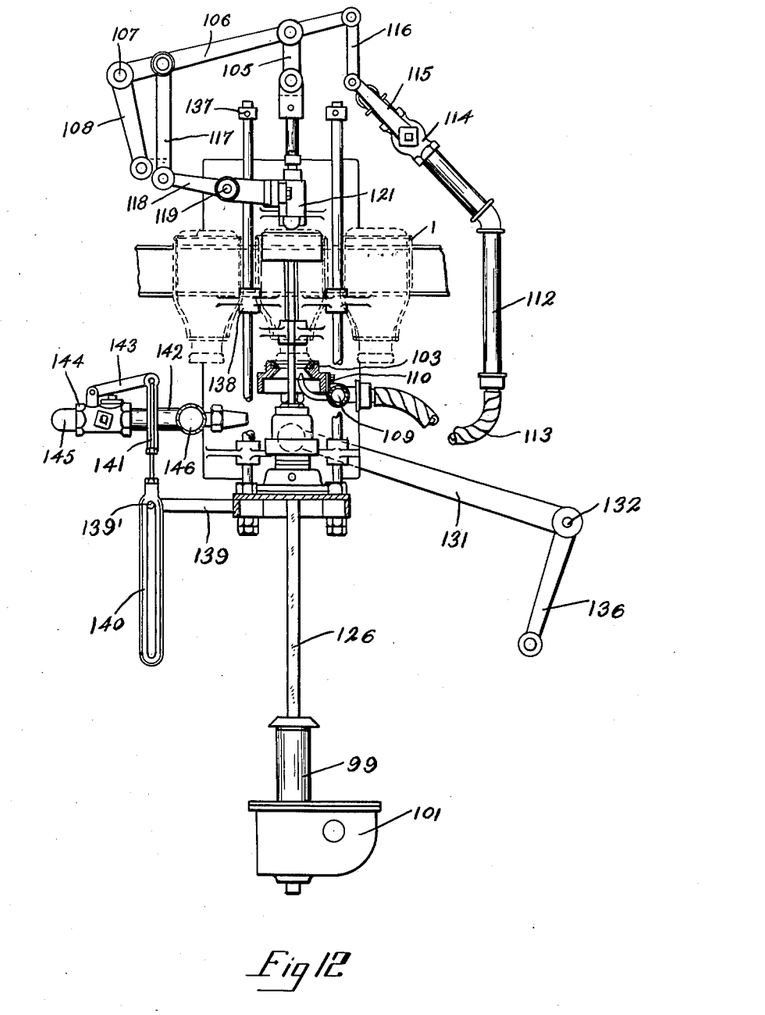
Fig. 12 is a side elevation corresponding to Fig. 11 showing brushes inserted in bottles.
Figure 13:
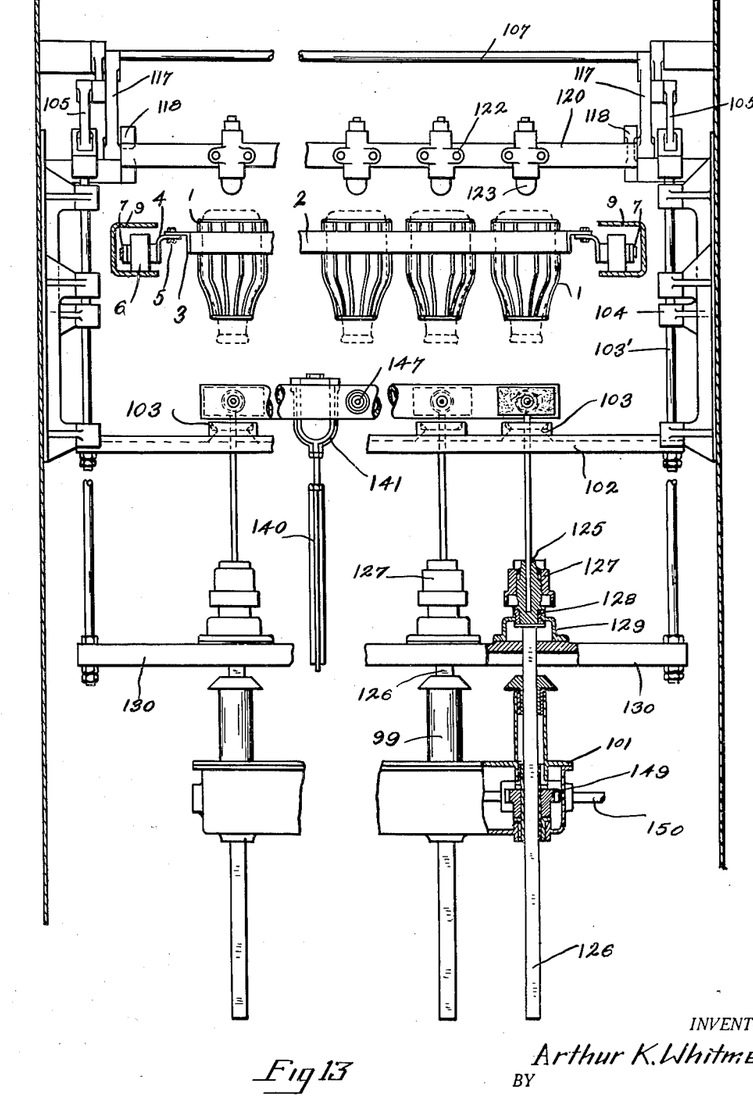
Figs. 13 and 14 are end views corresponding to Figs. 11 and 12, respectively.

After the bottles have been sprayed and drained, the forward travel of the chain carries them in turn over an inside brushing arrangement. Referring more particularly to Figs. 12 to 14 inclusive, a bottom support 102 adapted to rise and support the bottles periodically, holds the bottles against turning with the revolving of the brush. This support is provided with a tapered seat 103 of non-injurious material for centering the bottle with the brush 100. The elevating and lowering of support 102 is accomplished by vertical rods 103' which slide in guides 104, these rods being moved by means of links 105 and levers 106 mounted on shaft 107 and operated through lever 108. Attached to the support 102 is a manifold 109 supported by means of clip 110, this manifold being provided with spray nozzles 111 which register with the center of each bottle and spray rinse water on the inside of the bottle. The manifold is connected to a water supply line 112 by means of flexible tubing 113, the water supply in the line 112 being controlled by valve 114. The valve 114 is opened and closed by lever 115 which connects, through the aid of a link 116, with the lever 106. Fig. 11 shows the inside brushing mechanism in the disengaged position. When the mechanism commences to engage the bottle and assume the position shown in Fig. 12, the lever 106 raises the support 102 to engage the neck of the bottle and, at the same time, this lever also opens the valve 114 through the linkage above described, thus causing the support 102 and the valve 114 to keep in time. There is one of these support-lifting mechanisms on each side of the washer, but it is necessary to provide only one with the valve-working mechanism as will be obvious.

The lever 106 also operates a holding means for the bottom of the bottle which, at this point in the washer, is on top. To each of the levers 106 is connected a link 117 and this is connected in turn to a lever 118 fulcrumed on a pin 119, the other ends of levers 118 being connected together by means of the cross bar 120. On the cross bar 120 are mounted heads 121 held to the cross bar by means of screws 122. These heads register centrally with the bottle and are provided with a plunger 123, the tension of the plunger being controlled by a spring 124. When the upward movement of lever 106 raises the bottle neck support 102 and opens the valve 114, it also, with the aid of the link 117 and fulcrum lever 118, causes the downward movement of head 121 relieving any strain on the wire basket 1 and holding the bottle for inside scrubbing with the brush 100. When the brushing operation is finished, downward movement of lever 106 causes the support 102 and the head 121 to back away from the bottle, thus leaving the bottle free to advance to the next position and permitting another bottle to take its place for a repetition of the operation.

The bristle brush 100 has its stem inserted in a collet 125 and is clamped to the drive shaft 126 by means of a nut 127. The upper portion of this drive shaft 126 is provided with a bearing 128 supported on a pedestal 129 from a cross member 130. The cross member 130 is raised and lowered by means of a lever 131, of which one end is connected to a shaft 132 and the other end to a lug 133 by means of links 134 and pins 135. The movement of lever 131 is controlled by lever 136 and the cross member 130 is guided by rods 137 which slide in guides 138.

The cross member 130 on which the brushes are mounted is provided with a stud 139 having a pin at its outer end which slides freely in a slotted link 140 which, in turn, is connected to fork-shaped members 141 which straddle the pipe 142. The members 141 connect with levers 143 and operate spring-actuated valve 144 connected to a steam supply line through pipe 145. Pipe 142 connects with a header 146 running crosswise of the washer, this header being provided with a series of spray nozzles 147 that register centrally with brush 100 when the latter is in its downward or withdrawn position. As the cross member 130 approaches its extreme downward point of travel, the stud 139 engages the lower portion of link 140 and pulls this link downward. The link, through the members 141 and 143, opens the valve 144 and allows steam or other sterilizing medium to enter header pipe 146 and to be ejected through the spray nozzles 147 on the revolving brushes 100, thoroughly sterilizing these before they enter the next rank of bottles. Upon the return stroke, when the cross member 130 commences to travel upwardly again, the stud 139 releases the tension on slotted link 140 and permits the valve 144 to close and shut off the supply of sterilizing medium. The gear box 101 does not move but is stationarily attached to the washer body 11 by means of brackets 148 while brush driving shaft 126 slides up and down in gear 149. Gear 149 is one of a pair of spiral gears driven by a shaft 150 which connects with a source of power supply (not shown).

After the final brushing, the bottles are given a semi-final rinse inside and out by semi-final rinse water sprayed through nozzles 151 and 152 (see Fig. 2). The bottles are then advanced over the final rinse compartment 153 where they are given a thorough rinsing with fresh water by means of nozzles 154 and 155. While the bottles are passing over the drainboard 156 they become thoroughly drained before being ejected from the chain baskets at point U (Fig. 1) by ejection fingers 157 carried on cross bar 158 and swung about the pivoted pin 159 by the arm 160. This movement is accomplished through a lever 161 connecting with the source of power. The bottles are ejected over a corrugated sloping bridge 162 onto a tilting table 163 which is pivoted on a shaft 164, the tilting of the table raising the bottles to vertical position whereupon they are pushed off the table onto a bottle conveyor 165 by means of member 167. Lever means convey the necessary motion to the tilting table. The conveyor 165 is connected to a general conveying system for conveying the bottles to the filling room and the dry, clean bottle finally leaves the washer.

The endless chain which conveys the bottles through the body of the washer is advanced intermittently by the hook-shaped member 168 connected to lever 169 by means of pin 170, the upper part of lever 169 being pivotally connected to bearing housing 171 by means of pin 172. The lever 169 is moved back and forth by the connecting rod 173 which is attached to a crank 174 on a reduction gear box 175 driven by an electric motor 176 through a flexible coupling 177.

My new bottle washer is of partly articulated construction so that the mechanism is readily accessible when repairs or adjustments are occasionally necessary. For example, the bottle rack 13 may be lifted from the U-shaped bearings 14 permitting the drainboard 178 to be removed from the washer by means of the handles 179. This allows easy access to the pre-rinse brushes for replacing and adjusting. Also, side cover door 180 allows easy access to the inner mechanism of the washer by removing thumb screws 181 and clean-out doors 182, held in place by screws 183, also help to simplify the cleaning of the washer. Other features of my apparatus which go to make up a practical structure include leveling screws 184 provided to permit the leveling up of the washer on the floor, the floor being sloped for draining. A sediment-removing door 185 allows sediment and dirt in the bottom of the washer to be readily removed. Occasionally the roller chain carrying the baskets through the washer may require adjustment to take up slack or for other reasons and this is provided for by making the chain channel with a detached section. One end of this section is provided with a bracket 186 which is fastened to a channel member and is pivoted about a cross shaft 187, the ends of which are supported in a U-shaped bearing 188. The upper end of the channel is provided with a bracket 189 to which a stay rod 190 is pivotally connected and the washer body 11 is provided with a bracket 191 so that, by means of nuts 192, the end portion of the channel can be swung in and out on the pivoted shaft 187.

The operation of my washer will be set forth by tracing the course of bottles therethrough. The one operator necessary places bottles on the rack 13, as many as the width of the washer permits be handled together, for example in an eight-wide washer, eight bottles would be placed on the rack. The pre-rinse loading carrier swings into position adjacent the rack ready to receive the bottles. The rack tilts and slides the bottles into the carrier which then swings around the pivot 18 while the cross bar 24 prevents the inverted bottles from sliding out of the bottle pockets. The carrier comes to rest on the upper end of the inclined sliding carrier where pins 31 push the bottles out of the loading carrier, the cross bar 24 having swung upwardly out of the way due to the counterweight 27. The loading carrier is then free to swing back again on the pivot 18 and assume the position adjacent the bottle rack 13 ready to receive the next eight bottles, or whatever the number which the washer is constructed to handle.

The pre-rinse sliding carrier is caused to move downwardly on the tubular track 42 by means of the link 47 operated by levers 48 and 49 connected to the motive power. The pins 31 push the bottles over brushes 30 which are revolved by driving gears in gear box 58 while the tubes 56 play streams of water into the interiors of the bottles. This effects a thorough pre-rinsing and removes dirt and milk which would otherwise foul the soaking solution in the washer tank. The partly cleaned bottles now return to the at-rest position which they formerly occupied, near the top of the slide, a part of the sliding mechanism traveling farther than the rest in order to clear the bottle of the pin 31 for a purpose to be set forth below. The brushes 30 are now free of the bottles, but may have become contaminated by germs in the latter. To insure that the contamination shall not be transmitted to succeeding bottles, the brushes are now swung about trunnions on the gear box 58 and dip into a sterilizing solution 59 contained in a compartment formed in part by the partition 59'. The brushes are revolving constantly and, after being sterilized, swing back again to their former position adjacent the sliding carrier.

While the bottles are on the lower part of the sliding carrier over the brushes, a pre-rinse discharge carrier has swung over on the pivot 54 to take the position just vacated by the loading carrier which has returned to the vicinity of the rack 13. The rinsed bottles on the upward movement of the sliding carrier, find the discharge carrier waiting to receive them and they are pushed into this device. The pin 31 has traveled a further distance upward, as mentioned above, so that it does not interfere with the passage of the bottles into the discharge carrier. The bottles are pushed into this carrier bottoms first and are to be discharged therefrom necks first. It is, accordingly, possible to close permanently, one end of the bottle pocket formed by the members 66 and 67, with cross bars 68 to prevent bottles from being pushed on through the pocket or from sliding out while in a vertical position. Another cross bar is provided on the receiving and discharging end of the pocket to prevent bottles from sliding out when the carrier is in the inverted position. This means consists of a cross bar 63 which rests on the bracket 64' while the discharge carrier is being loaded, thus being kept out of the way. When the discharge carrier has been filled, it swings about the pivot 54 and, as the bottles rise in the first part of their course, they register with the cross bar 63 and this cross bar is then locked in position to prevent the bottles from falling out. The locking mechanism consists of a fork-shaped lug 72 on the arm 69 of the cross bar 63, and of a latch member 75. These two elements carry rollers 73 and 79 respectively which contact with each other when the bottles register opposite the cross bar 63, thus locking the cross bar in front of the bottles. When the discharge carrier passes the vertical, this latch member 75 drops away from the lug 72 due to its own weight, allowing the rollers 73 and 79 to roll apart. A counterweight 71 also connected to the cross member 63 is now free to drop, under the influence of gravity, and pulls the cross bar away from in front of the bottles. During the remainder of the carrier travel, the bottles are in an upright position and there is no need of the cross bar to hold them in the pockets. When the carrier has reached its discharging position opposite the endless chain of baskets traveling through the washer tank, the receiving and discharging end of the bottle pocket is again free and pins 82 now come up and push the bottles out of the pockets into the baskets 1.

When the pre-rinse discharge carrier thus described has left its position at the top of the sliding carrier, the pre-rinse loading carrier again swings over with a new load of bottles from the rack 13, these are rinsed, and the brushes sterilizer, the loading carrier again swinging back and the empty discharge carrier taking its place, thus continuously and automatically pre-rinsing bottles under sterile conditions and continuously loading them into an endless chain for soaking and subsequent operations.

The bottles are now carried downwardly into a soaking solution which occupies the bottom of the washer body, it being understood that the endless chain shown is but one of several which pursue parallel courses through the washer. The bottles are carried along the bottom of the washer, soaking in an alkali solution, until they reach the opposite side of the tank where they are raised and begin to drain. When the bottles reach the top of the washer at the point P they are completely inverted and drained. Jets 91 and 92 spray the bottles inside and out, it being understood that the movement of the endless chain is intermittent, each rank of bottles stopping for a given period necessary to complete each treatment. The bottles now drain off over the drainboard 93 and are brought over another set of brushes 100 for a final brushing operation.

As the bottles come to position over the brushes, these latter are pushed up into the interior of the bottles by means of the lever 131 connected to operating means through the link 136 and other connecting elements. At the same time, heads 121 are moved downward to press against the bottom of the bottles and hold these against the brushes while supports 102 are brought up against the necks of the bottles to center them and hold them against turning with the brushes. A linkage permits the upper and lower holding means to be operated from the same source and the linkage also operates a valve 114 which controls a supply of rinse water to be sprayed into the interior of the bottles through nozzles 111. After the final brushing has been completed, the bushes are withdrawn from the bottle by the lever 131 and an arm connected to the brush shaft operates a valve 144 in a steam line. The valve is opened by the pull of the stud 139 on the slotted link 140, the stud 139 traveling up and down with the brushes. When the brushes reach their lowest position, they are in register with nozzles 147 through which steam is blown on the brushes to sterilize them before they move upwardly again to enter the next rank of bottles.

The endless chain then carries the bottles over various spraying nozzles, the final rinsing being with fresh water. The bottles become thoroughly drained before reaching the point of ejection U, where ejection fingers push the bottles out of the baskets and onto a tilting table 163. The tilting table raises the bottles to a vertical position and they are then pushed off the table onto a conveyor 165 which carries the bottles to the filling room where they are filled with milk and again put in use.

My new and improved washer, particularly adapted for the washing of milk bottles, but which may be used for washing bottles of all kinds, is an apparatus fully continuous and automatic in operation and easily kept clean and in repair but which, in addition to performing the functions of washers now in use, performs the additional function of sterilizing the means such as brushes which are used for cleaning the interior of the bottles. After insertion in each bottle, the brushes are thoroughly sterilized in one of two ways, either by dipping the brush in a sterilizing solution or by blowing steam directly on the brush. It is to be understood that, while I have shown the pre-rinse brushes as being sterilized in a solution and the final rinse brushes as being sterilized by means of steam, either of these methods can be used for both sets of brushes, a washer making use only of a sterilizing solution or making use only of steam.

It will also be understood that the washer may be operated without a pre-rinse brushing, only a final brushing in the washer body being used with either the solution dip or fluid spray method of sterilizing the brushes.

So far as I am aware, no washer previously in use provides means for sterilizing the cleaning means between each bottle to avoid contaminating succeeding bottles nor has the method of washing bottles under sterilizing conditions continuously and automatically ever heretofore been put to practice.

Other modes of applying the principles of my invention may be employed instead of the one explained, change being made as regards the means and the steps herein disclosed, provided those stated by any of the following claims or their equivalent be employed.

I therefore particularly point out and distinctly claim as my invention:

1. In a bottle washer including means for cleaning a succession of bottles, means for carrying said bottles through a washing fluid and other means for again cleaning said bottles, the combination which comprises means for sterilizing both of said cleaning means respectively after cleaning each bottle.

2. A bottle washer comprising means for loading bottles, holding means for said bottles, means for cleaning said bottles, means for sterilizing said cleaning means after cleaning each bottle, and means for removing said bottles from said holding means.

3. A bottle washer comprising a bottle rack, a sliding carrier, a swingable receiver adapted to transfer a bottle to said sliding carrier from said rack, an arm adapted to push said bottle over a revolving brush, an arm adapted to remove said bottle from said brush, and means for swinging said brush away from said sliding carrier and into contact with a sterilizing medium.

4. A bottle washer comprising a bottle rack, a sliding carrier, a swingable receiver adapted to transfer a bottle to said sliding carrier from said rack, an arm adapted to push said bottle over a revolving brush, an arm adapted to remove said bottle from said brush, and means for swinging said brush away from said sliding carrier into contact with a sterilizing medium, and returning the sterilized brush to position adjacent said sliding carrier.

5. A continuous bottle washer comprising a bottle rack, a sliding carrier, a swingable receiver adapted to transfer a succession of bottles from said rack to said sliding carrier, an arm adapted to push said bottles over a revolving brush, an arm adapted to slide said bottles away from said brush, and means for swinging said brush away from said sliding carrier and into a sterilizing solution.

6. A bottle washer comprising a bottle rack, a sliding carrier, a swingable receiver adapted to transfer a succession of bottles from said rack to said sliding carrier, means on said receiver to prevent bottles sliding out when the receiver is in an inverted position, an arm adapted to push said bottles over a revolving brush, a bed adapted to remove said bottles from said brush, and means for swinging said brush away from said sliding carrier and into contact with a sterilizing medium.

7. A bottle washer comprising means for loading bottles, means for cleaning and rinsing said bottles, and means for sterilizing said cleaning means after cleaning each bottle.

8. A bottle washer comprising a bottle rack, a loading carrier, a sliding carrier, said loading carrier being adapted to transfer a bottle from said rack to said sliding carrier, a revolving brush positioned to register with and adapted to clean a bottle on said sliding carrier, and means for swinging said brush into contact with a sterilizing medium after cleansing each bottle.

9. A bottle washer comprising bottle-holding means, means for mechanically cleaning a series of bottles, and means for sterilizing said cleaning means after cleaning each bottle.

10. A bottle washer comprising bottle-holding means, means for mechanically cleaning a series of bottles, and means for subjecting said cleaning means to a sterilizing solution after cleaning each bottle.

11. A bottle washer comprising a bottle-holding means, a brush adapted to be inserted in a series of bottles, and means for sterilizing said brush after each insertion into a bottle.

12. A bottle washer comprising bottle-holding means, a brush adapted to be inserted in a series of bottles, and means for dipping said brush into a sterilizing solution after each insertion into a bottle.

13. A bottle washer comprising bottle-holding means, a brush adapted to be inserted in a series of bottles, and means for spraying a sterilizing fluid on said brush after insertion into each bottle.

14. A bottle washer comprising a conveyor having a plurality of baskets, means for inserting bottles in said baskets, means for passing said bottles through a cleaning bath, means for rinsing said bottles, means for cleaning said bottles, and means for sterilizing said cleaning means after cleaning each bottle, and means for removing said bottles from said conveyor.

15. A bottle washer comprising a conveyor, means for placing bottles in said conveyor, cleaning means adapted to be inserted in said bottles while in said conveyor, means for sterilizing said cleaning means after cleaning each bottle, and means for removing said bottles from said conveyor.

16. A bottle washer comprising a conveyor, means for placing bottles in said conveyor, revolving brushes adapted to be inserted in said bottles while in said conveyor, and means for sterilizing said brushes after insertion in each bottle.

17. In a bottle washer, the combination which comprises means for passing bottles successively over cleaning means, means for holding said bottles in contact with said cleaning means, means for separating said bottles and said cleaning means, and means for sterilizing said cleaning means before contacting with the next rank of bottles.

18. In a bottle washer, the combination which comprises means for passing ranks of bottles successively over brushes, means for holding said bottles against said brushes, means for retracting said brushes from said bottles, and nozzles adapted to spray a sterilizing fluid on said brushes after cleaning each rank of bottles.

19. A bottle washer comprising bottle-holding means, means for mechanically cleaning a series of bottles, and means for subjecting said cleaning means to the sterilizing action of steam after cleaning each bottle.

20. A bottle washer comprising bottle-holding means, a brush adapted to be inserted in a series of bottles, and means for subjecting said brush to the sterilizing action of a jet of steam after each insertion into a bottle.

21. In a bottle washer, the combination which comprises means for passing bottles successively over brushes, means for inserting said brushes in said bottles, mean for holding the bottoms of said bottles against said brushes, and means for centering the necks of said bottles during brushing, means for simultaneously bringing said holding and said centering means into contact with said bottles, means for withdrawing said brushes and said holding and centering means, and means actuated by said withdrawing means for sterilizing said brushes.

22. In a bottle washer, the combination which comprises a conveyor for successively bringing a plurality of bottles into arrested position at a brushing station, a brush mounted to move into and out of a bottle at said brushing station, a nozzle for projecting a sterilizing fluid onto said brush while the latter is in retracted position, a valve for said nozzle, and means for synchronously actuating said brush and said valve.

23. In a bottle washer, the combination which comprises a conveyor for bringing a bottle over a brush, said brush being mounted on a vertical shaft, means for raising said brush and shaft periodically into the interior of a bottle, a nozzle, and a valve controlling the emission of fluid from said nozzle, and means connecting said shaft to said valve to cause the latter to discharge intermittently a sterilizing fluid on said brush.

24. In a bottle washer including means for advancing bottles successively through such washer and means for holding said bottles at a brushing station, the combination which comprises a brush adapted to enter a bottle and to be withdrawn therefrom, a valve-controlled nozzle positioned opposite said brush when the latter is in the withdrawn position and means synchronized with said brush for operating said valve so as to discharge a fluid when the brush is opposite the nozzle.

ARTHUR K. WHITMER.